United States Patent
Okamura et al.

(10) Patent No.: US 6,541,938 B2
(45) Date of Patent: Apr. 1, 2003

(54) CONTROL SYSTEM FOR SMALL ELECTRIC MOTOR VEHICLE

(75) Inventors: Yukihiko Okamura, Kadoma (JP); Kenji Sakamoto, Kadoma (JP); Tsutomu Inui, Wako (JP); Hiroo Kanke, Wako (JP)

(73) Assignees: Matsushita Electric Works, Ltd., Kadoma (JP); Honda Giken Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/928,438

(22) Filed: Aug. 14, 2001

(65) Prior Publication Data

US 2002/0021106 A1 Feb. 21, 2002

(30) Foreign Application Priority Data

Aug. 18, 2000 (JP) ........................................ 2000-248583
Aug. 18, 2000 (JP) ........................................ 2000-248584

(51) Int. Cl.[7] ............................................... H02P 1/26
(52) U.S. Cl. ...................... 318/778; 318/805; 318/812; 180/65.1
(58) Field of Search ......................... 180/65.1; 318/778, 318/779, 798, 805, 812

(56) References Cited

U.S. PATENT DOCUMENTS 4,200,175 A * 4/1980 Dick ............................ 477/175
4,313,080 A * 1/1982 Park ............................ 320/123
4,729,447 A 3/1988 Morse ......................... 180/65.1

FOREIGN PATENT DOCUMENTS

| JP | 5-30612 | 2/1993 |
| JP | 2724565 | 12/1997 |
| JP | 10-165454 | 6/1998 |

* cited by examiner

*Primary Examiner*—Karen Masih
(74) *Attorney, Agent, or Firm*—Armstrong, Westerman & Hattori, LLP

(57) ABSTRACT

In a small electric motor vehicle equipped with an electric motor for driving wheels through a reduction gear mechanism, a first predetermined voltage is immediately applied to the electric motor when a drive-off instruction is generated from vehicle standstill and then the voltage is increased at a predetermined rate until the voltage exceeds a second predetermined voltage, and is then controlled such that the driving speed converges to a desired speed. With this, since the application of the first predetermined voltage slightly rotates the electric motor to take up reduction gear mechanism backlash, shock at drive-off caused by reduction gear mechanism backlash can be reduced or eliminated even when a high-capacity electric motor is used to enhance hill-climbing performance, and smooth drive-off is possible. Furthermore, since the rate of increase/decrease of the driving speed is varied in proportion to the difference between a set speed and a calculated command speed, the driving feel is therefore improved.

10 Claims, 18 Drawing Sheets

KP: PROPORTIONAL GAIN
KI: INTEGRAL GAIN

CONTROL SYSTEM FOR SMALL ELECTRIC MOTOR VEHICLE

BACKGROUND OF THE INVENTION

1. Field of the Invention

This invention relates to a control system for a small electric vehicle or car usable as an electric wheelchair, golf cart or the like.

2. Description of the Related Art

Small electric vehicles of the type referred to above are taught by U.S. Pat. No. 4,729,447 and Japanese Laid-Open Patent Application No. Hei 10(1999)-165454. In addition, Japanese Patent No. 2,724,565 teaches control for preventing abrupt drive-off from standstill, enabling smooth drive-off, and, when the small electric vehicle rolls back owing to insufficient torque during hill climbing or the like, increasing the output torque of the electric motor for driving the small electric vehicle to enable smooth hill climbing.

The power trains of vehicles of this type ordinarily constituted of a combination of an electric motor and a reduction gear mechanism, and the electric motor output is transmitted to the wheels through the reduction gear mechanism. When the small electric vehicle is driven off at a situation where the amount of reduction gear mechanism backlash is great, therefore, a shock is imparted to the operator/passenger (s). The shock is particularly pronounced when the vehicle is equipped with a large-capacity electric motor to enhance hill-climbing performance.

However, the prior art has focused solely on smooth drive-off control and the like and provides no measure whatsoever regarding the shock produced by reduction gear mechanism backlash.

Moreover, Japanese Laid-Open Patent Application No. Hei 5(1993)-30612 teaches utilizing the electric motor as a regeneration brake during deceleration, for example, to achieve smooth driving, when alternate acceleration and deceleration are repeated.

This type of vehicle is equipped with, for example, a maximum speed switch for inputting a maximum speed and an accelerator (accelerator lever) for inputting drive-off and stop instructions, and a command speed is calculated and used to increase/decrease the driving speed to obtain a set speed (desired speed) calculated based on the outputs of the maximum speed switch and the accelerator. Since the rate of speed increase/decrease (acceleration or deceleration) is constant, however, the vehicle driving speed changes abruptly in response to a slight manipulation of the accelerator by the operator. This gives the operator an unnatural feeling.

In other words, this prior art (mentioned in 5(1993)-30612) technology has a problem regarding the driving "feel" but none of the conventional technologies provide any countermeasure regarding this point whatsoever.

SUMMARY OF THE INVENTION

An object of this invention is therefore to provide a control system for a small electric vehicle overcoming the foregoing problem that enables smooth drive-off while also reducing or eliminating drive-off shock caused by reduction gear mechanism backlash even when a high-capacity electric motor is installed to enhance hill-climbing performance.

Another object of this invention is therefore to provide a control system for a small electric vehicle overcoming the foregoing problem that improves the feel of driving by avoiding abrupt change in driving speed even when the operator manipulates the accelerator slightly.

For achieving the first object, there is provided a system for controlling a small electric motor vehicle equipped with an electric motor for driving wheels through a reduction gear mechanism, comprising: a speed setting switch which generates a signal indicative of a maximum speed inputted by a vehicle operator; an accelerator which generates signals indicative of drive-off instruction and stop instruction inputted by the vehicle operator; and an electric motor controller which inputs the signal generated by the speed setting switch and the accelerator and determines a desired speed and conducts a first voltage control of the electric motor such that a driving speed converges the desired speed; wherein the electric motor controller conducts a second voltage control to immediately apply a first predetermined voltage to the electric motor when the drive-off instruction is generated from vehicle standstill and then to increase the voltage at a predetermined rate until the voltage exceeds a second predetermined voltage, and then conducts the first voltage control such that the driving speed converges to the desired speed.

For achieving the second object, there is provided a system for controlling a small electric motor vehicle equipped with an electric motor for driving wheels through a reduction gear mechanism, comprising: a speed setting switch which generates a signal indicative of a maximum speed inputted by a vehicle operator; an accelerator which generates signals indicative of drive-off instruction and stop instruction inputted by the vehicle operator; a speed controller which calculates a set speed based on the signals of the speed setting switch and the accelerator and calculates a command speed to accelerate or decelerate a driving speed at a rate which is varied all with a difference between the set speed and the command speed, such that a driving speed converges to the set speed; and an electric motor controller which feedback-controls a voltage to be applied to the electric motor such that an error between the command speed and the driving speed decreases.

BRIEF DESCRIPTION OF THE DRAWINGS

This and other objects and advantages of the invention will be more apparent from the following description and drawings, in which.

DETAILED DESCRIPTION OF THE PREFERRED EMBODIMENTS

A control system for a small electric motor vehicle according to a first embodiment of the present invention will now be explained with reference to the attached drawings.

Figure 1:
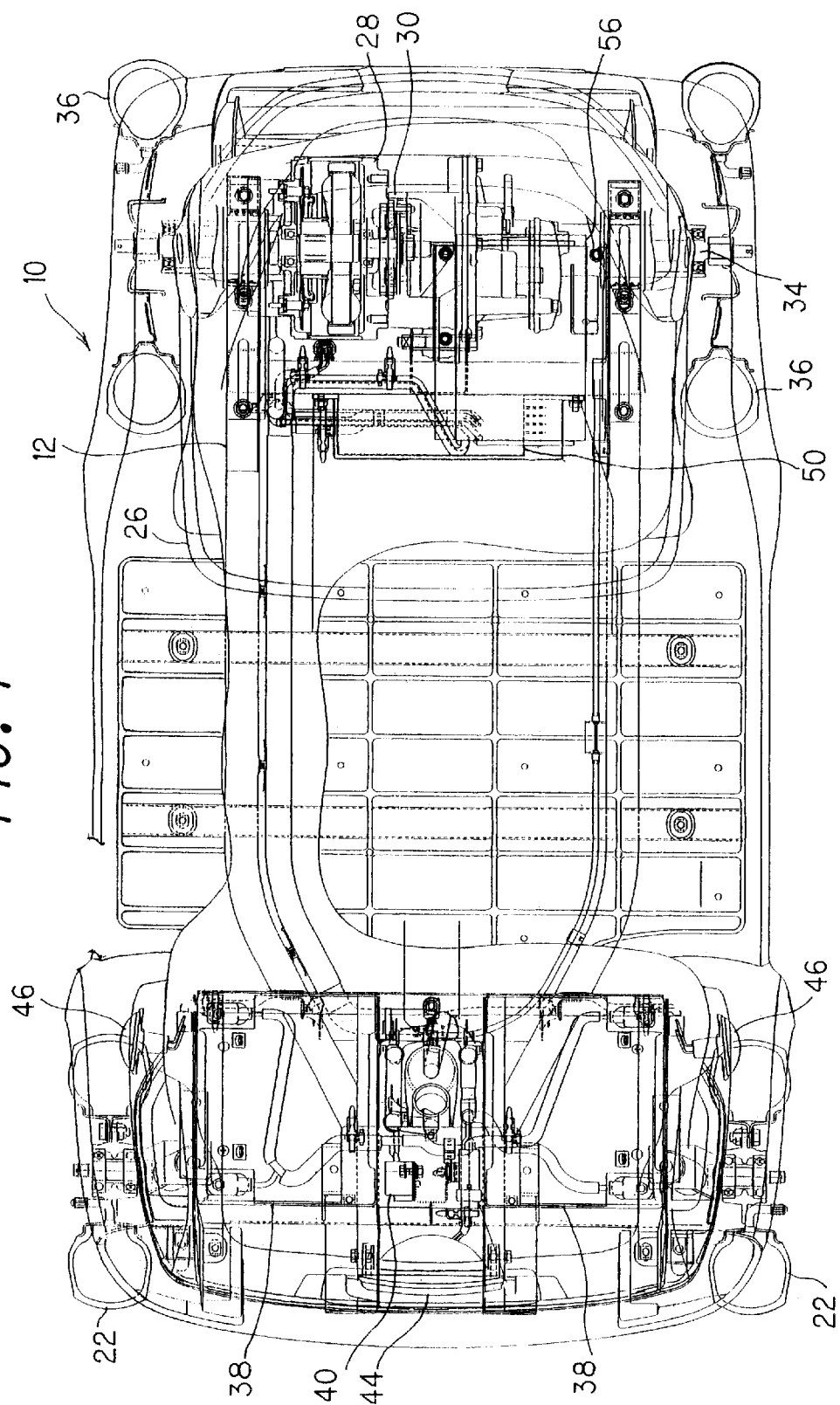
FIG. 1 is plan view of a control system for a small electric motor vehicle, more specifically of a small electric vehicle installed with the control system, according to a first embodiment of the invention.
Figure 2:
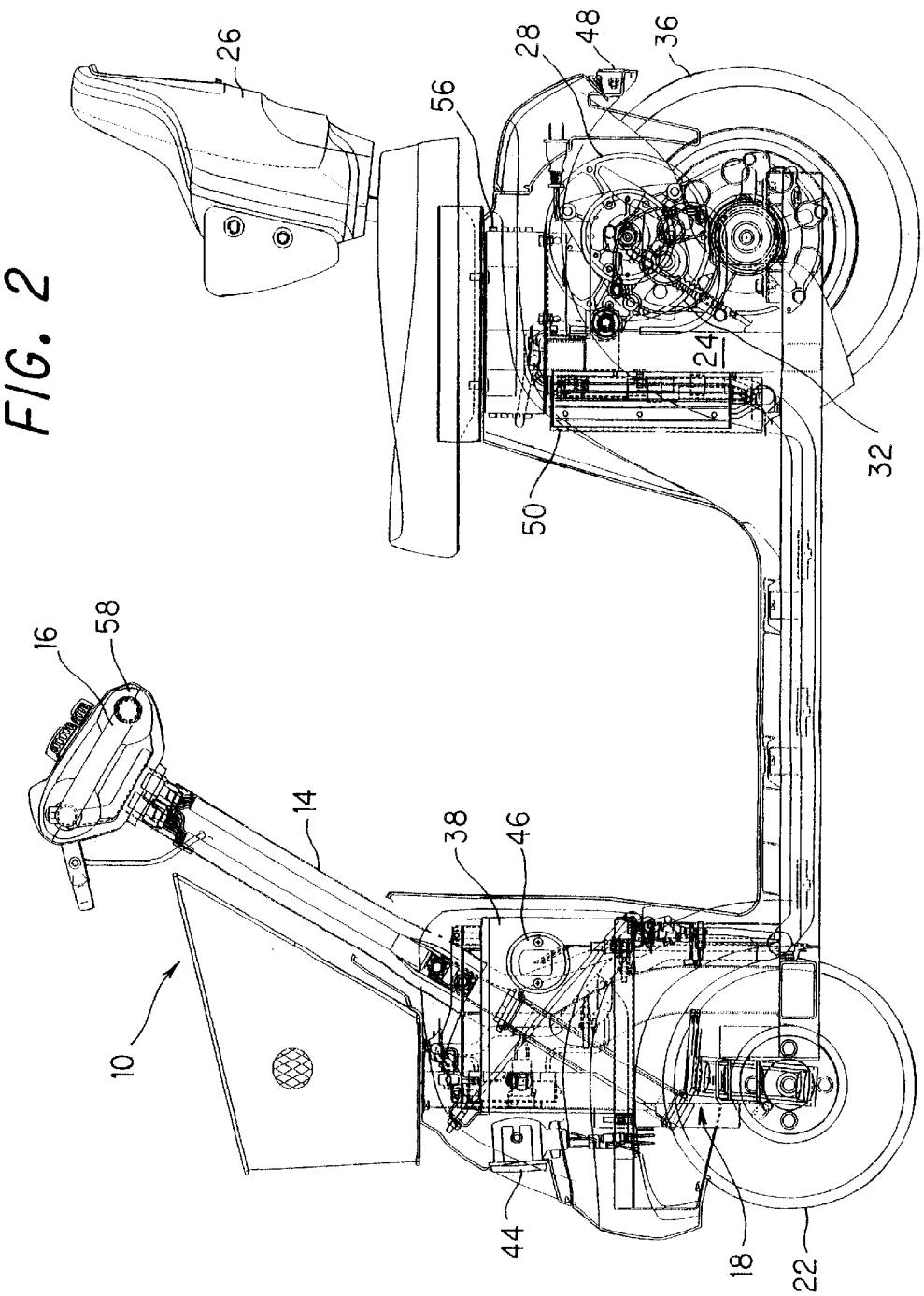
FIG. 2 is a reduced side view of the small electric vehicle of FIG. 1.
Figure 3:
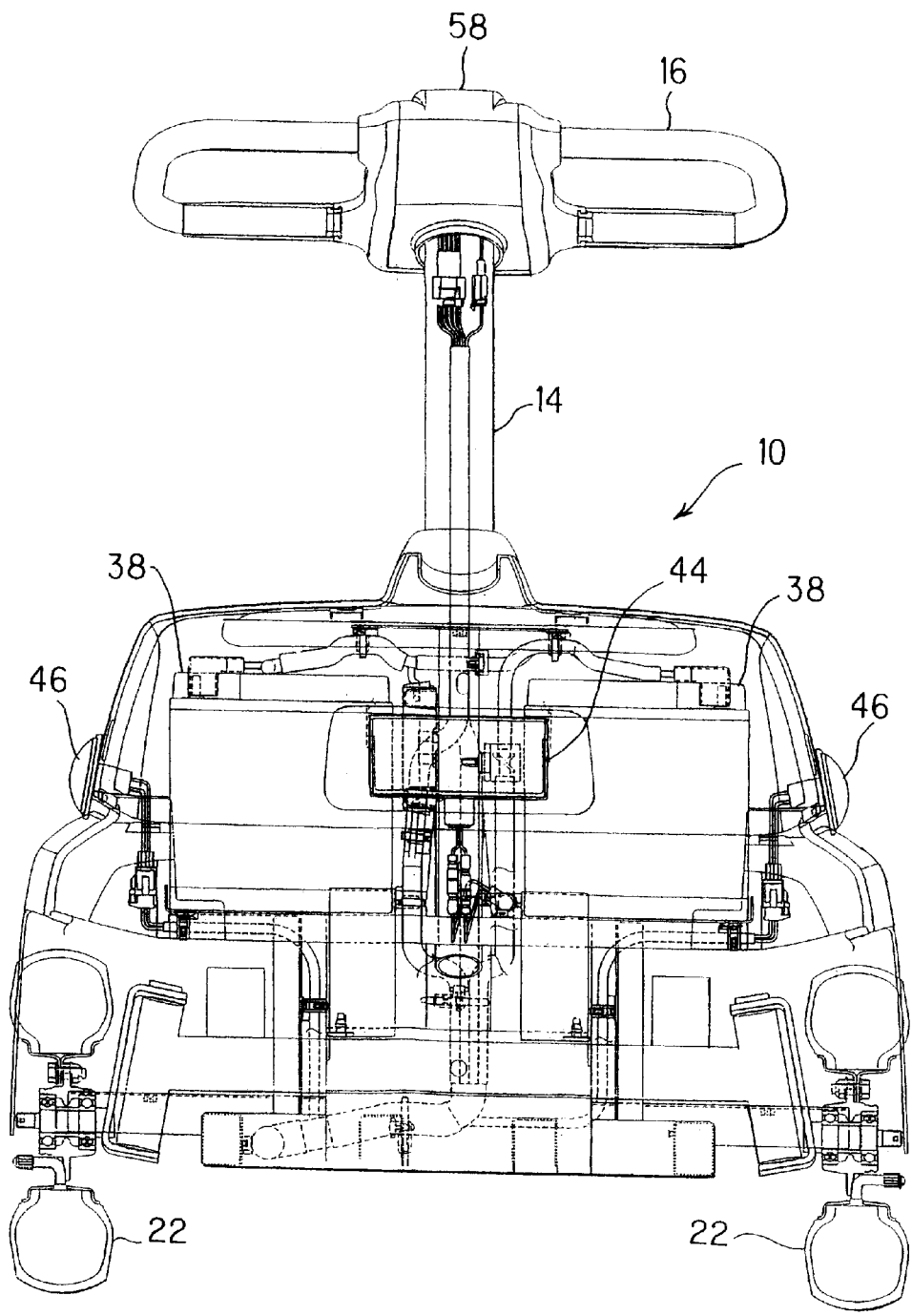
FIG. 3 a front view of the small electric vehicle of FIG. 1.
Figure 4:
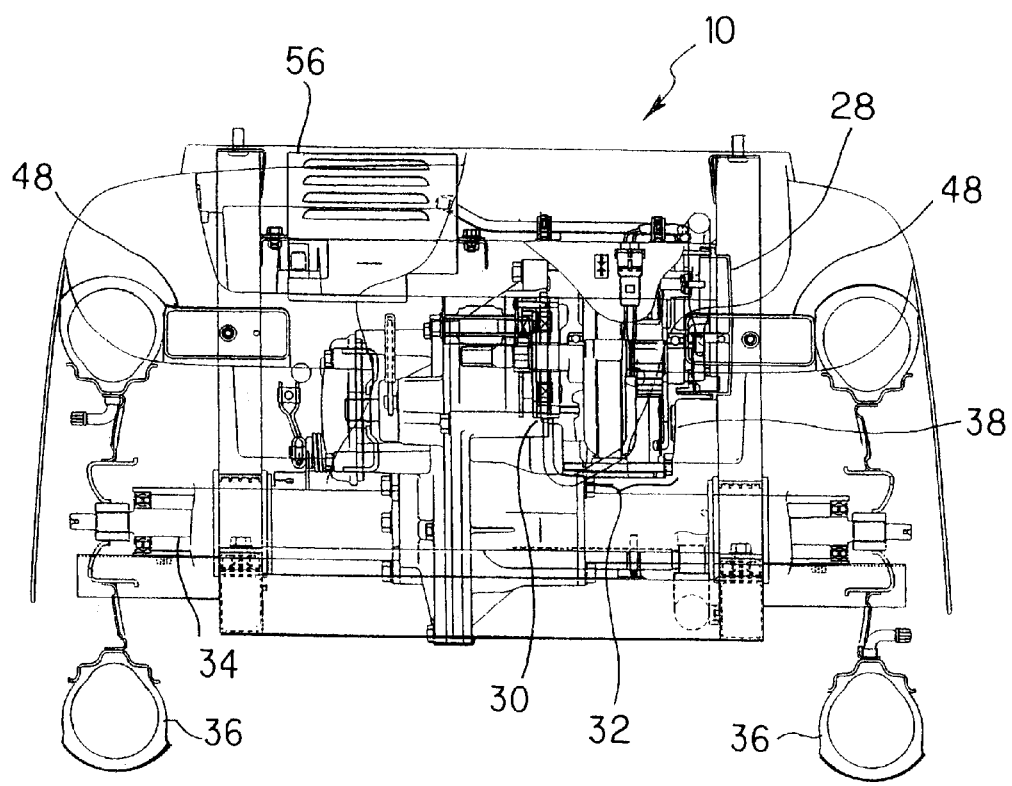
FIG. 4 a rear view of the small electric vehicle of FIG. 1.

FIG. 1 is a plan view of the control system for a small electric motor vehicle, more specifically of a small electric vehicle installed with the control system. FIG. 2 is a reduced side view of the same, FIG. 3 is a front view of the same and FIG. 4 is a rear view of the same.

A small electric motor vehicle (hereinafter simply referred to as "vehicle") 10 installed with the control system according to this embodiment of the invention has a main frame 12 and a scooter-like shape. A steering pipe 14 is attached to the front end of the main frame 12 and a steering wheel 16 is attached to the upper end of the steering pipe 14.

The other end of the steering pipe 14 is connected with two front wheels 22, 22 through a gear mechanism 18. Rotation of the steering wheel 16 steers the front wheels 22, 22 in the corresponding direction by a corresponding angle. A post 24 rises from the rear end of the main frame 12 and a seat 26 for the operator is attached to the upper end of the post 24. (The seat is omitted from FIGS. 3 and 4.)

An electric motor (generator) 28 is installed under the seat 26. The output of the electric motor 28 is transmitted through a magnetic brake 30 and a reduction gear mechanism 32 to an axle 34 to drive two rear wheels 36, 36 at opposite ends of the axle 34. The electric motor 28 is electrically connected with two batteries (onboard power sources) 38, 38 accommodated in the vicinity of the steering pipe 14 on the front-wheel side and is operated to rotate when supplied with the battery voltage (12 V from each battery). The four-wheel configuration with the batteries located between the front wheels makes the vehicle 10 stable. Reference numeral 40 designates a main fuse box.

As shown in FIG. 3, the front of the vehicle 10 is equipped with a headlight 44 and on opposite sides thereof with winker lights 46, 46 for indicating turning direction. As shown in FIG. 4, the rear of the vehicle 10 is equipped with two reflectors 48, 48.

The electric motor 28 is controlled by a control unit (Electronic Control Unit; electric motor controller and speed controller) 50 installed adjacent to the electric motor 28 in the space under the seat 26 over the rear wheels. (Exactly speaking, the reference numeral 50 in the drawings designates the box in which the control unit is accommodated but for simplicity of illustration the reference numeral is herein defined as designating the control unit inside.) The control unit 50 is equipped with a microcomputer.

Figure 5A:
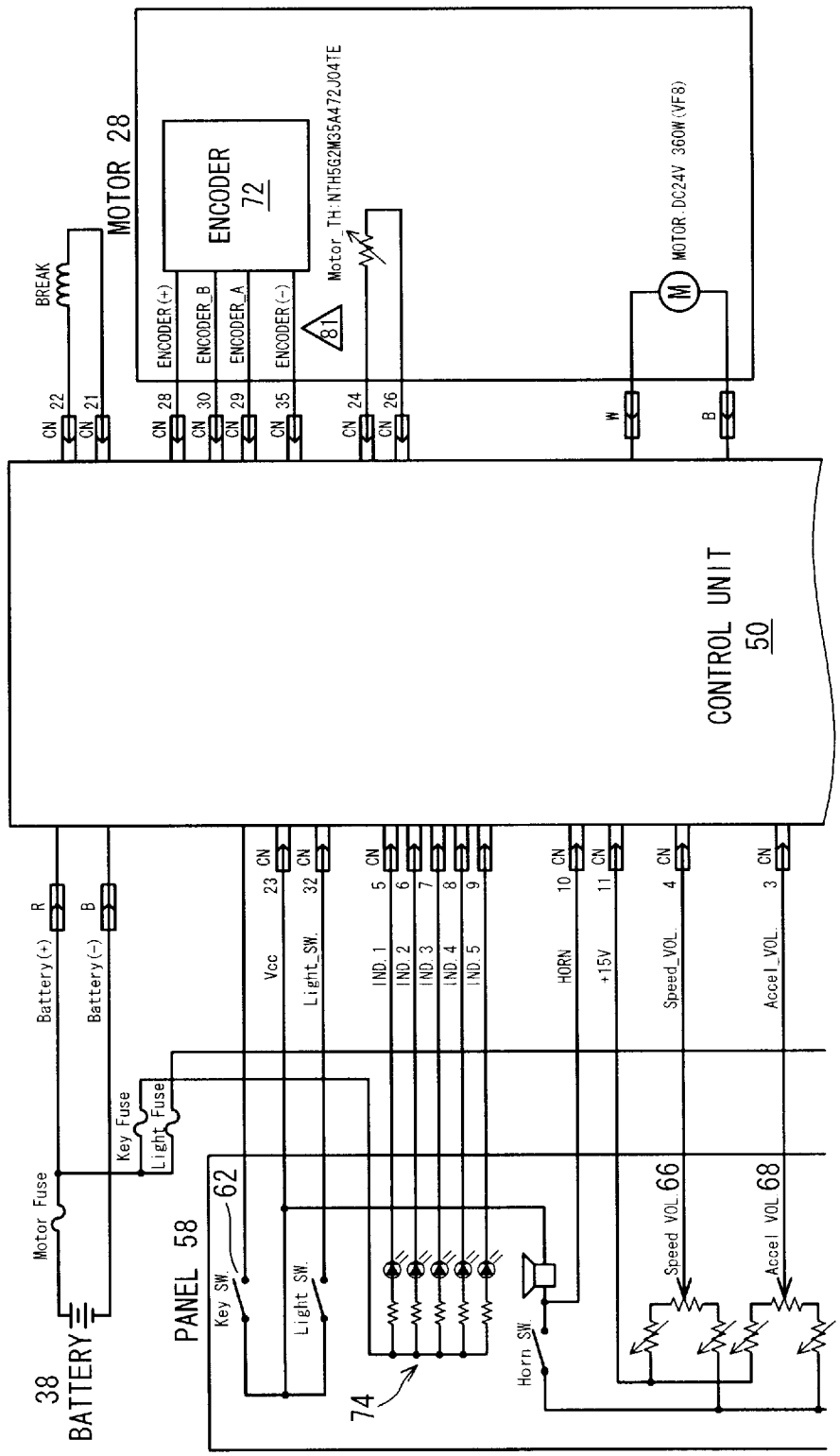
FIG. 5A is a block diagram showing the first half of the concrete configuration of a control unit mounted in the, small electric vehicle
Figure 5B:
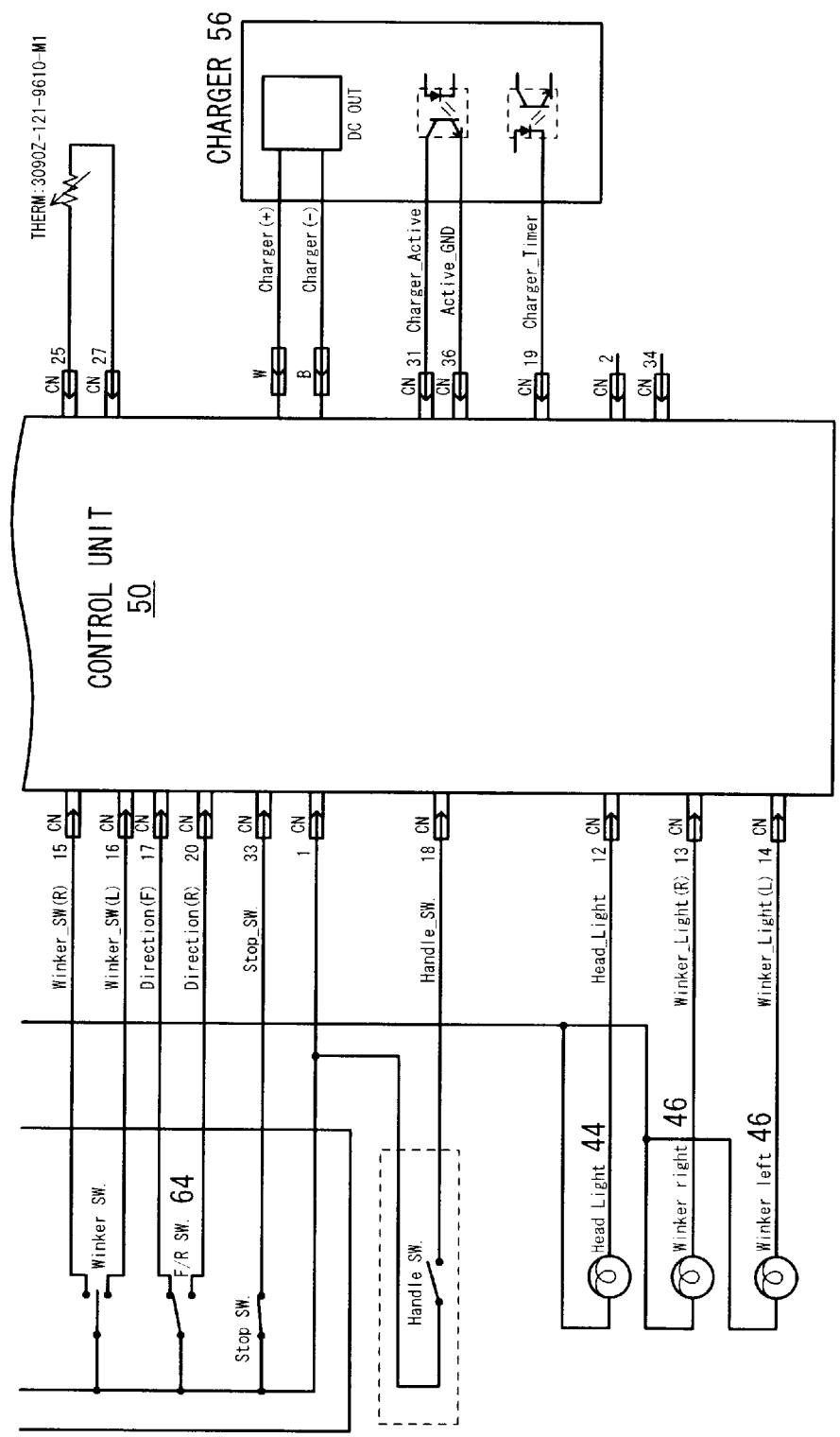
FIG. 5B is a similar block diagram showing the latter half of the same.
Figure 6:
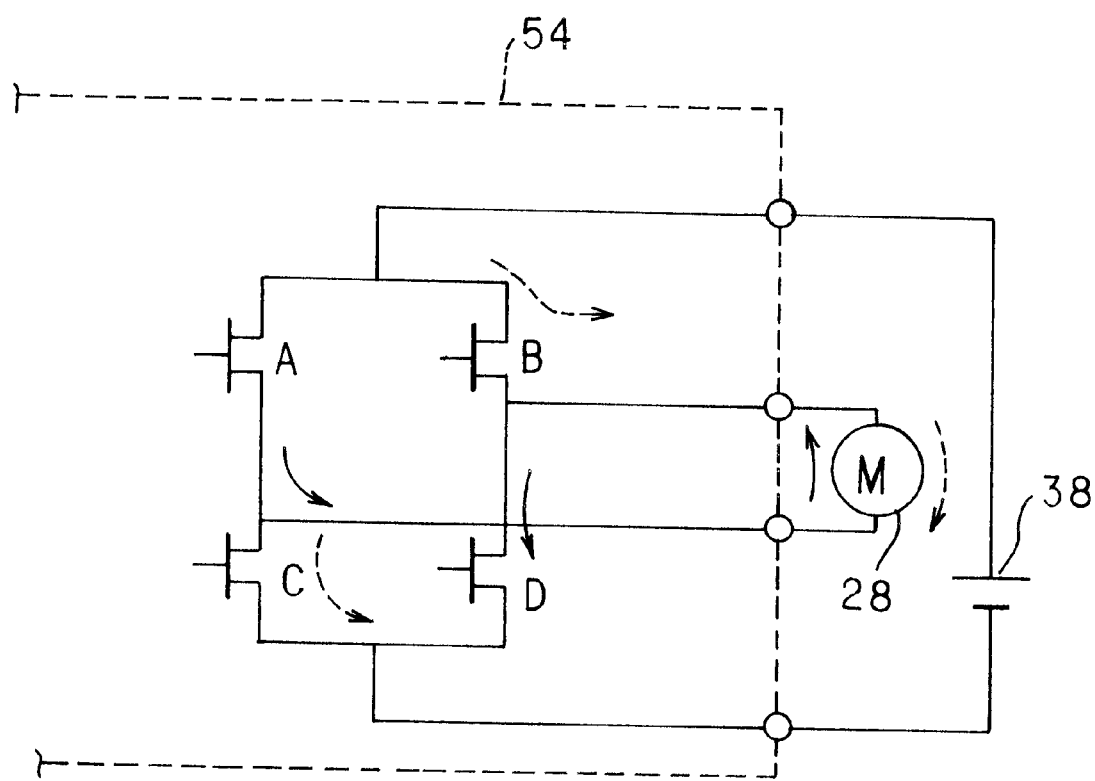
FIG. 6 is a circuit diagram showing the particulars of a motor drive circuit built into the control unit.

FIG. 5 is a circuit diagram showing the particulars of the control unit 50. Although omitted from FIG. 5, the control unit 50 is, as shown in FIG. 6, equipped with a motor drive circuit 54. The motor drive circuit 54 includes a bridge circuit composed of four Field Effect Transistors (switching devices) A, B, C and D.

As shown in FIG. 6, when the two opposed FETs A and D turn on and source current flows as indicated by the solid arrows, the electric motor 28 rotates forward in the direction of the solid arrow to drive the vehicle 10 in the forward direction. On the other hand, when the two opposed FETs B and C turn on and source current flows as indicated by the broken arrows, the electric motor rotates backward in the direction of the broken arrow to drive the vehicle 10 in the reverse direction. When the two parallel-connected FETs C and D turn on, a motor coil shortcircuit state is produced.

Under prescribed operating conditions, the electric motor 28 operates as a generator to charge the batteries 38, 38. The batteries 38, 38 can also be charged through a charger 56 by an external DC power source.

Figure 7:
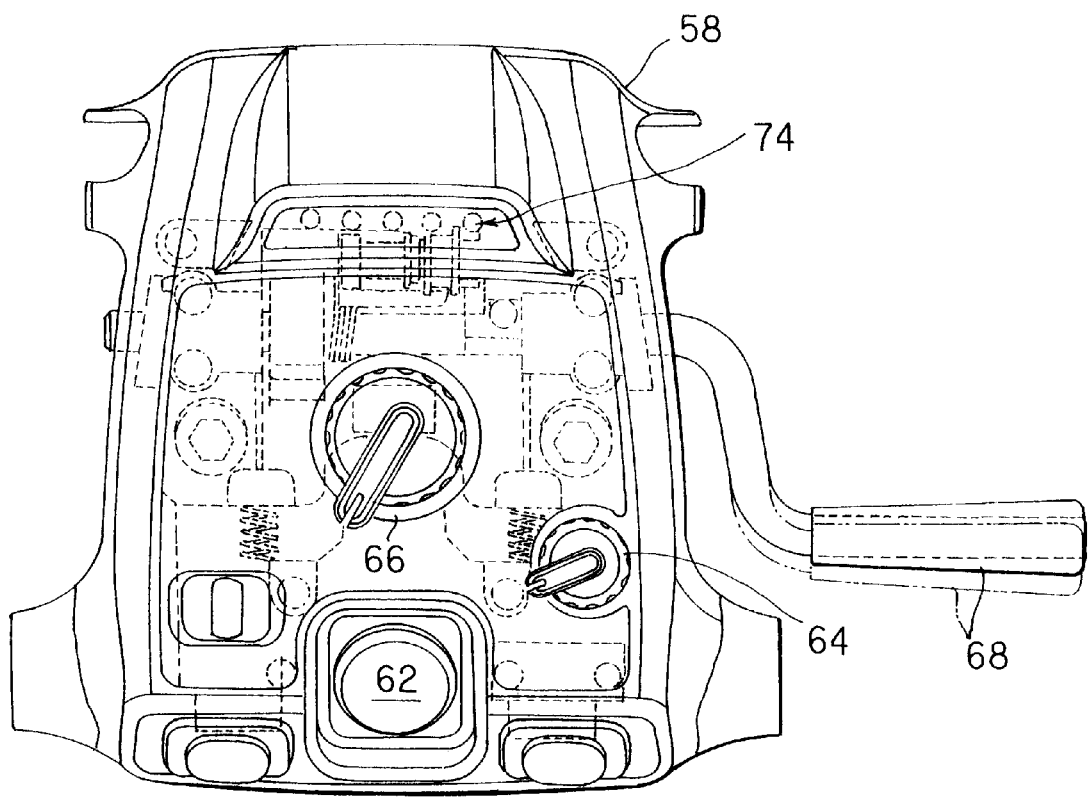
FIG. 7 is an enlarged top view of a main control panel of the small electric vehicle.
Figure 8:
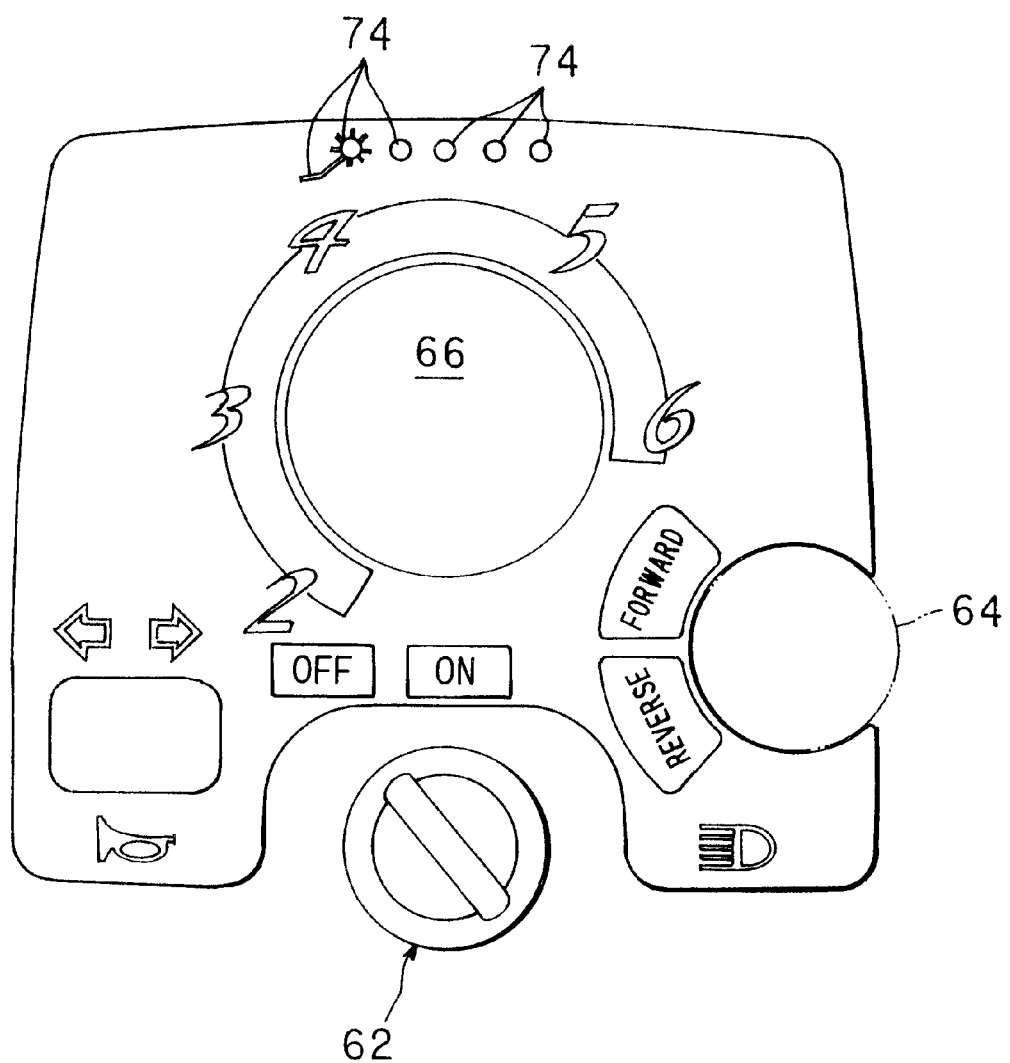
FIG. 8 is an explanatory view of the main control panel of FIG. 7.

A main control panel 58 is installed in the vicinity of the steering wheel 16. FIG. 7 is an enlarged top view of the main control panel 58 and FIG. 8 is an explanatory view showing the markings on the panel portion (indicated as PANEL in FIG. 5). (The steering wheel 16 is omitted in FIG. 7.)

As illustrated in FIG. 7, a rotary key-operated switch 62 is provided at the bottom of the main control panel 58. The key-operated switch 62 is provided in the motor drive circuit 54 connecting the electric motor 28 with the batteries 38, 38. (The switch 62 omitted in FIG. 6).

When the operator rotates the key-operated switch 62 to the OFF position indicated in FIG. 8, the batteries 38, 38 and the electric motor 28 are electrically disconnected. When the operator rotates the key-operated switch 62 to the ON position indicated in FIG. 8, the batteries 38, 38 and the electric motor 28 are electrically connected. A forward/reverse selector switch 64 for enabling the operator to select FORWARD (forward driving) or REVERSE (reverse driving) is provided to the upper right of the key-operated switch 62 as viewed in FIGS. 7 and 8.

Figure 9:
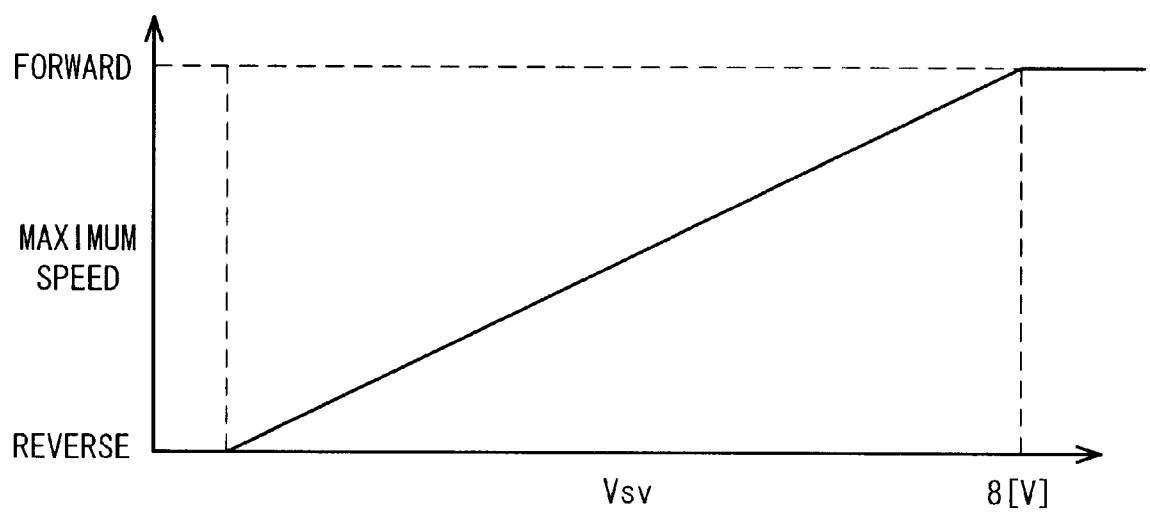
FIG. 9 is an explanatory graph showing the output voltage characteristics of a speed setting switch of the main control panel of FIG. 7.

A speed setting switch (speed volume) 66 is provided above the key-operated switch 62. Output voltage Vsv varies according to the position on the illustrated scale of 2 to 6 to which the operator turns the speed setting switch 66. More specifically, as shown in FIG. 9, the voltage Vsv can be varied between around 0 V and around 8 V to vary the set speed from 0 km/h to 6.5 km/h., which indicates a maximum speed. Thus, the speed setting switch 66 generates a signal indicative of the maximum speed inputted by the vehicle operator.

Further, as shown in FIG. 7, an accelerator (accelerator lever) or accelerator volume) 68 is provided on the right hand side of the main control panel 58. The free end of the accelerator 68 can be can be moved vertically, i.e., perpendicularly, with respect to the surface of the drawing sheet of FIG. 7. The operator inputs a drive-off (and acceleration) or stop instruction by moving the free end of the accelerator 68 downward relative to the drawing sheet. Thus, the accelerator generates signals indicative of drive-off instruction and stop instruction inputted by the vehicle operator.

The control unit 50 receives the outputs of the speed setting switch 66 and the accelerator 68, and determines or sets a desired speed (set speed) based on a maximum speed set by the speed setting switch 66 and the amount of manipulation of the accelerator 68, and determines or calculates a command speed to accelerate or decelerate the driving speed such that the driving speed (vehicle speed) converges to the desired speed as will be discussed later. The control unit 50 then conducts speed control (acceleration/deceleration control) for controlling the voltage applied to the electric motor 28 through the motor drive circuit 54.

A rotary encoder 72 (indicated as ENCODER in FIG. 5) is disposed on the output shaft of the electric motor 28 (not shown in FIGS. 1 to 4). The rotary encoder 72, which serves as driving start discriminating means and rotation direction detection means, outputs a signal, which being proportional to the motor speed, is proportional to the vehicle driving speed.

Figure 10A:
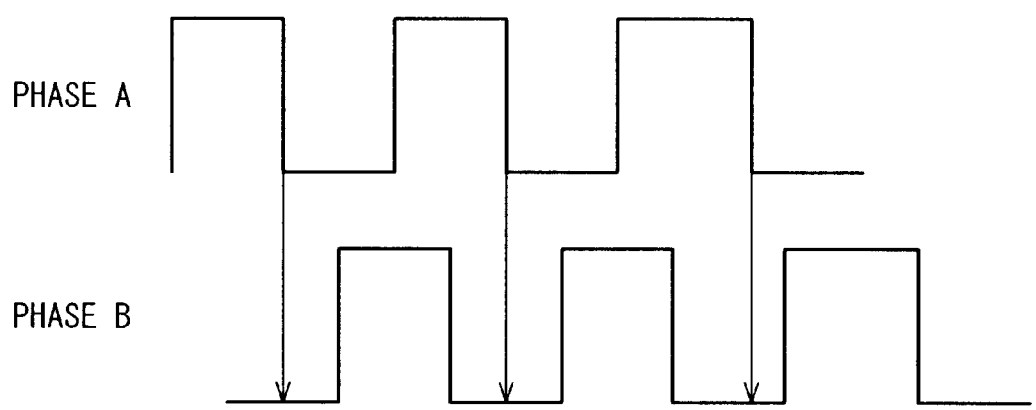
FIGS. 10A and 10B are set of time charts showing outputs of a rotary encoder shown in FIG. 5.
Figure 10B:
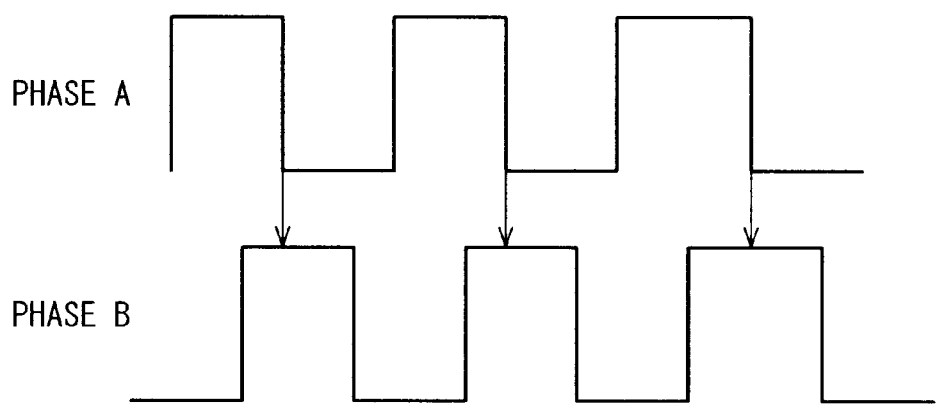

The rotary encoder 72 is composed of a magnetic ring having 24 pairs of magnetic poles that is fixed on the output shaft and two Hall effect ICs disposed near the magnetic ring (none of which members are shown). When the vehicle 10 is driving forward, the rotary encoder 72 outputs pulses composed of a phase A and a phase B at the timing shown in FIG. 10A. When the vehicle 10 is driving in reverse, it outputs pulses at the timing shown in FIG. 10B.

The output of the rotary encoder 72 is sent to the control unit 50, which uses it to discriminate whether or not driving of the vehicle 10 has started and to calculate the driving speed.

The operation of the control system of a small electric vehicle according to this embodiment will now be explained.

Figure 11:
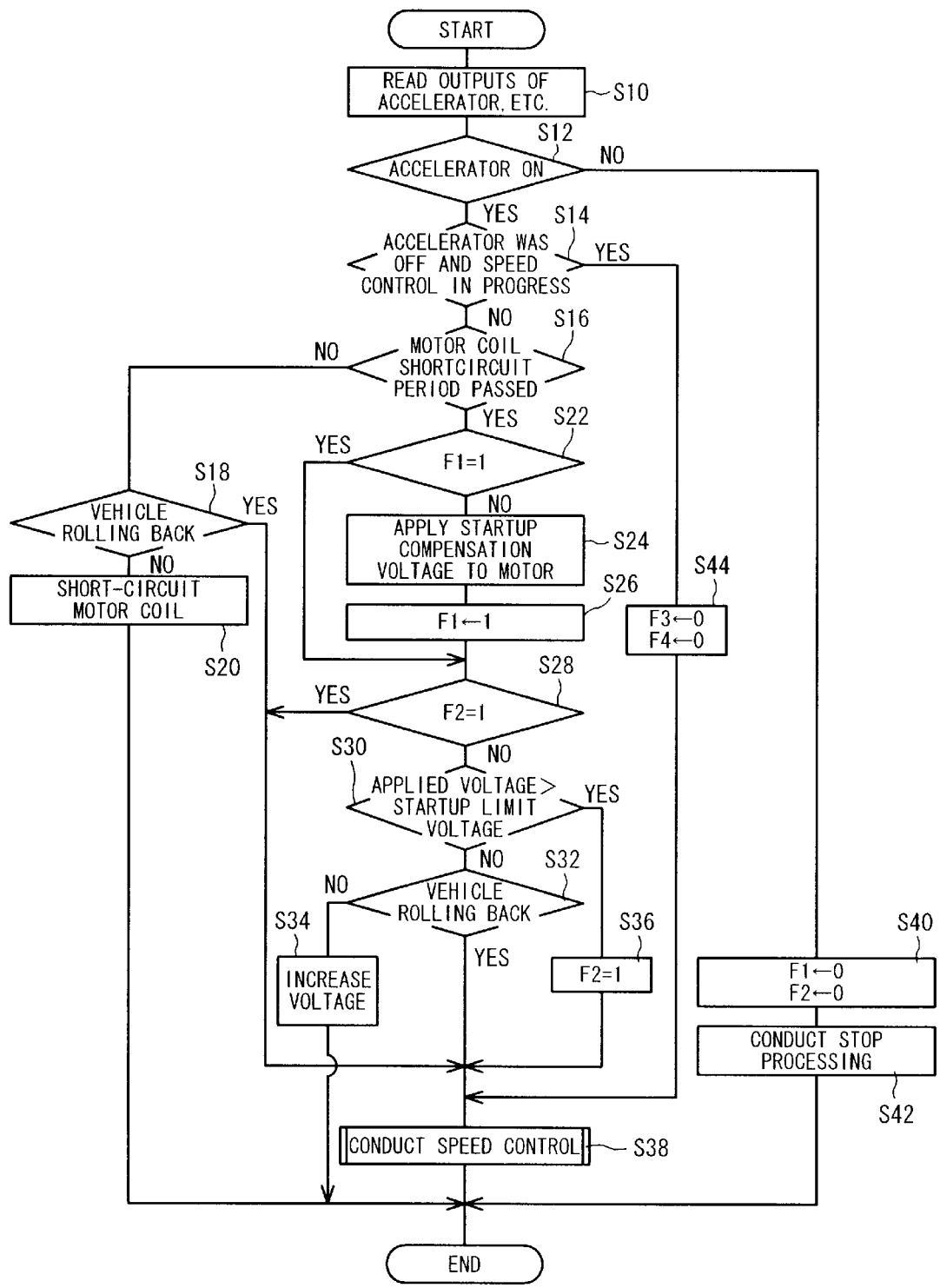
FIG. 11 is a flow chart showing the operations of the control system for a small electric motor vehicle shown in FIG. 1.

FIG. 11 is a flow chart showing the operation of the control system.

Figure 12:
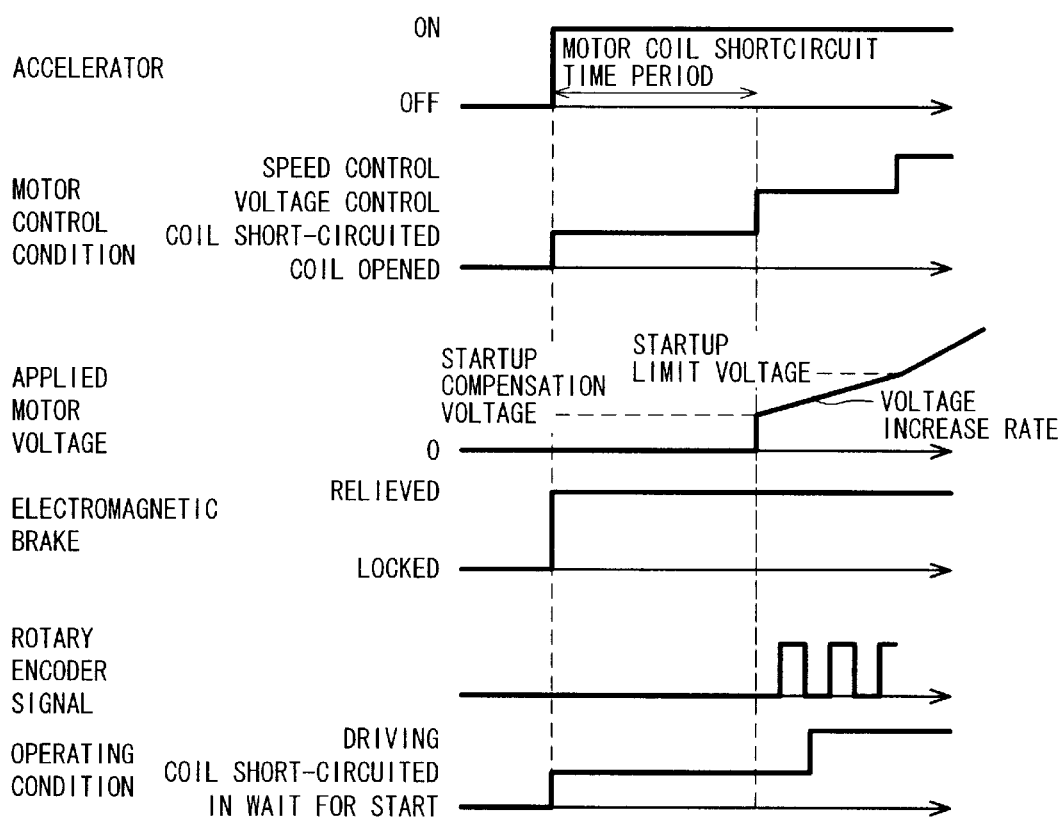
FIG. 12 is a time chart for explaining the processing conducted in the flow chart of FIG. 11 in the case of drive-off on a level terrain.
Figure 13:
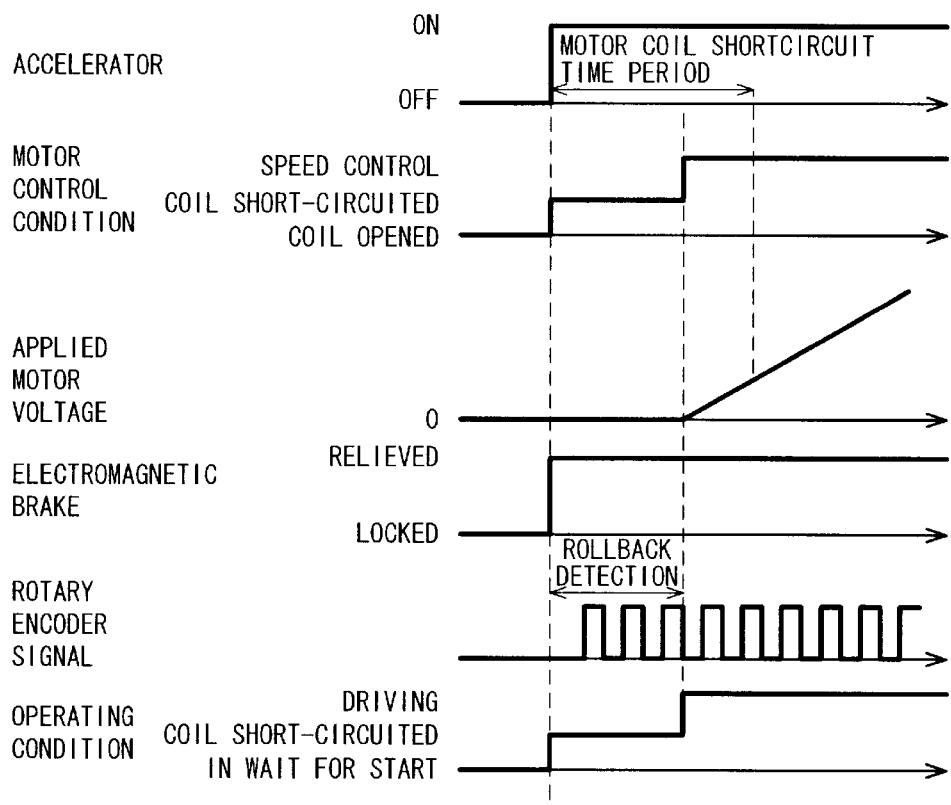
FIG. 13 is a time chart for explaining the processing conducted in the flow chart of FIG. 11 in the case of drive-off on a slope.
Figure 14:
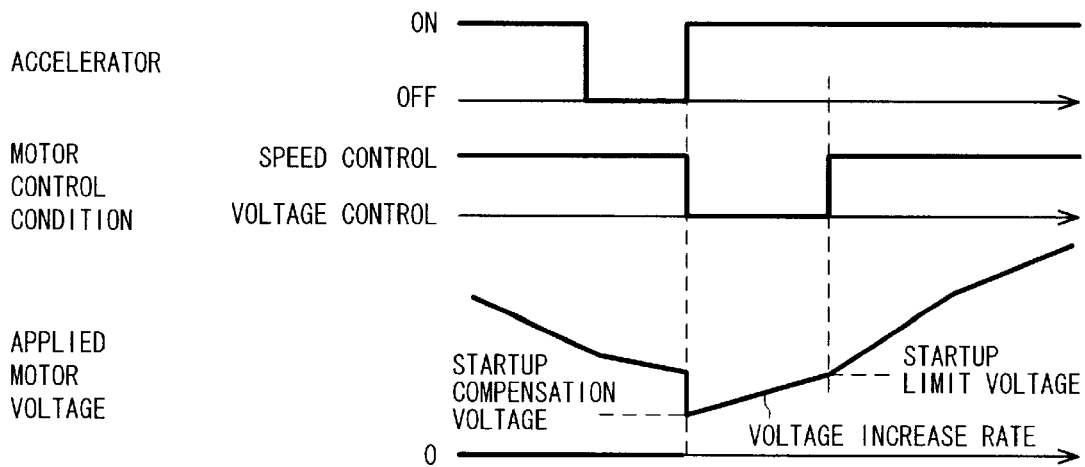
FIG. 14 is a time chart for explaining the processing conducted in the flow chart of FIG. 11 in the case where a drive-off (acceleration) instruction is input after a stop instruction was input.

The program represented by the flow chart is activated once every prescribed time interval. FIGS. 12 to 14 are time charts respectively for the case of drive-off on a level terrain, drive-off on a slope, and for the case where a drive-off (acceleration) instruction is input after a stop instruction was input.

The flow chart of FIG. 11 will now be explained while making reference to the time charts of FIGS. 12 to 14.

First in S10, the outputs of the accelerator 68 etc. are read. Next, in S12, it is checked whether the accelerator 68 is ON, i.e., whether a drive-off instruction has been input.

When the result in S12 is YES, the program goes to S14 in which it is checked whether the accelerator 68 was turned OFF in the preceding cycle and speed control is in progress. In other words, rather than one, such as shown in FIGS. 12 and 13, in which the control unit 80 received a drive-off instruction when at standstill, it is checked whether the current case is one, such as shown in FIG. 14, in which after a stop instruction was once input the accelerator 68 was again turned ON to input a drive-off instruction, i.e., a re-acceleration instruction was input.

When the result in S14 is NO, meaning that a drive-off instruction was input in the standstill state, the program goes to S16, in which it is checked whether a motor coil short-circuit time period (e.g., 2 msec) has passed. When the result is NO, the program goes to S18, in which it is checked whether the vehicle 10 is rolling back under its own weight, i.e., whether the vehicle 10 has started driving.

Specifically, this is carried out by checking whether the rotary encoder 72 has started to output a pulse train like that shown in FIG. 13, more specifically by checking whether the electric motor 28 has rotated by, for instance, 90°.

It is possible to judge from the phase of the output pulses of the rotary encoder 72 shown in FIG. 10 whether the direction of rotation of the electric motor 28 is opposite from that for driving in the direction intended by the operator and to judge that rollback has occurred (driving has started) when the electric motor 28 has rotated in the reverse direction by, for instance, 90°.

When the result in S18 is NO, the program goes to S20, in which the coil of the electric motor 28 is short-circuited and the program terminated.

In the next and succeeding program cycles, when the result in S16 is YES, the program goes to S22, in which it is checked whether the bit of a flag F1 is set to 1. When the result is NO, the program goes to S24, in which, as shown in FIG. 12, the electric motor 28 is applied with a startup compensation voltage (first predetermined voltage of, for example, 0.6 V) V1. By applying the startup compensation voltage, the electric motor 28 can be rotated slightly to take up the backlash of the reduction gear mechanism 32.

Next, in S26, the bit of the flag F1 is set to 1. The setting of the bit of this flag to 1 indicates that the startup compensation voltage was applied. When the result in S22 is YES, S24 and S26 are skipped.

Next, in S28, it is checked whether the bit of a flag F2 is set to 1. When the result is NO, the program goes to S30, in which it is checked whether the voltage applied to the electric motor 28 exceeds a startup limit voltage (second predetermined voltage of, for example, 1.0 V) V2.

When the result in S30 is NO, the program goes to S32, in which it is again checked by the same method whether rollback has occurred (i.e., the vehicle 10 has started driving). When the result is NO, the program goes to S34, in which the voltage applied to the electric motor 28 is increased at a predetermined increase rate (e.g., 0.4 V/400 msec) and the program is terminated.

Thus, voltage control is conducted to apply the startup compensation voltage and then apply voltage to the electric motor 28 at a predetermined increase rate until reaching the startup limit voltage. As a result, the vehicle 10 can be smoothly driven off while reducing or eliminating shock caused by backlash of the reduction gear mechanism 32.

When the result in S30 is YES, the program goes to S36, in which the bit of the flag F2 is set to 1. In the next and succeeding program cycles, therefore, S30 to S34 are skipped and speed control (explained below) is conducted immediately. Similarly, when the result in S18 is YES, then, as can be seen from FIG. 13, S22 to S36 are skipped so as not to conduct the foregoing voltage control but to move to speed control and control the applied voltage to obtain the desired speed immediately.

One reason for conducting control in this manner is that should the vehicle 10 roll back under its own weight, as may happen for example when driving off in the uphill direction of a slope, speed control can be immediately conducted to prevent further rollback (coasting). Another reason is that voltage control is unnecessary in the first place because backlash of the reduction gear mechanism 32 is minimum at the time of rollback.

The program then goes to S38, in which speed control is conducted.

Figure 15:
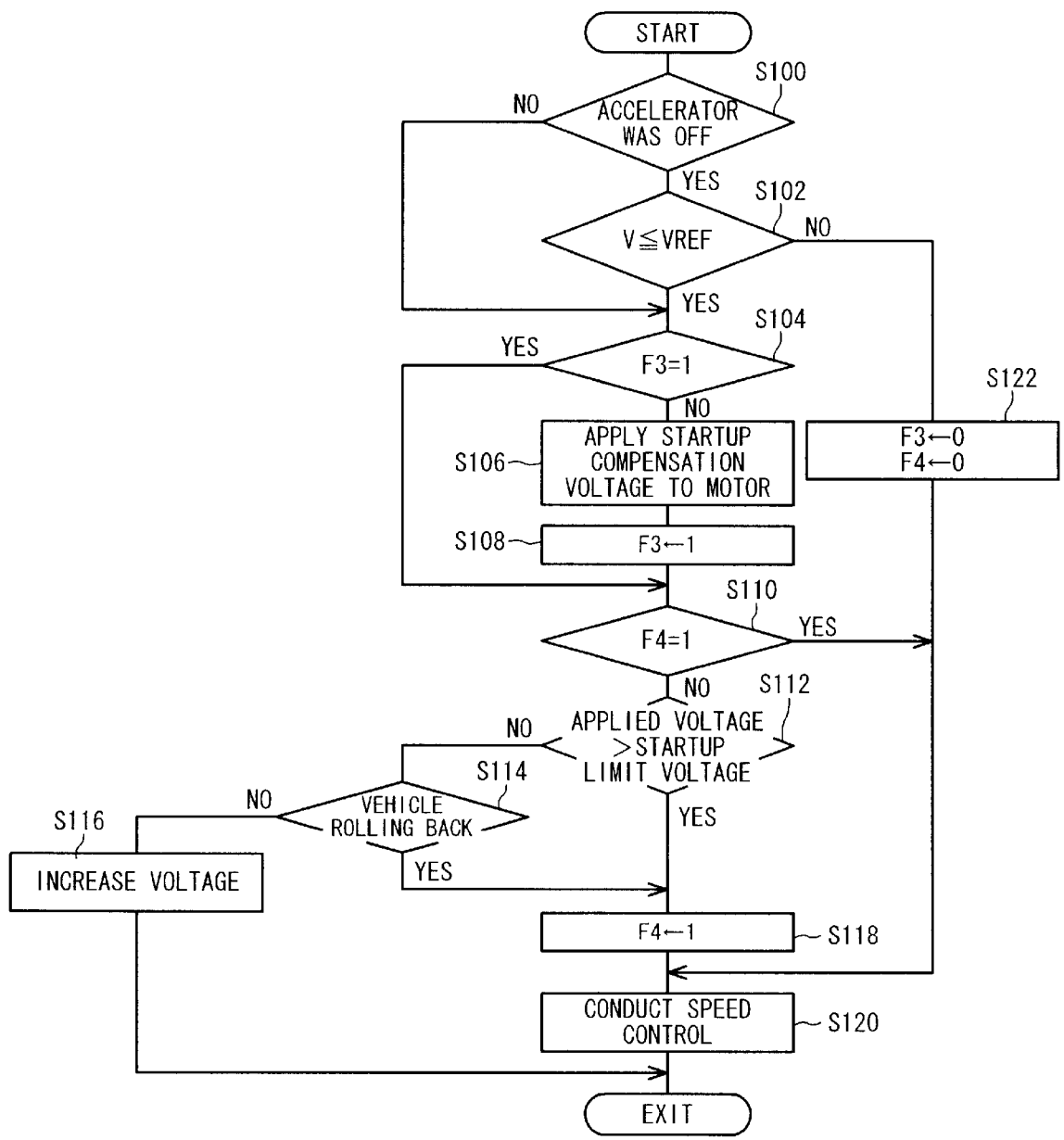
FIG. 15 is a subroutine flow chart showing the operations of the speed control referred to in the flow chart of FIG. 11.

FIG. 15 is a subroutine flow chart for explaining the processing conducted in S38.

First, in S100, it is checked whether the accelerator 68 was OFF in the preceding cycle. When the result is YES, the program goes to S102, in which it is checked whether the driving speed V is at or below a reference speed VREF (e.g., 0.7 km/h). The driving speed V is calculated from the output of the rotary encoder 72.

When the result in S100 is NO or the result in S102 is YES, implying an extremely low-speed state, i.e., that a stop instruction was followed by another drive instruction (accelerate instruction), the program goes through the steps from S104 to S118 to conduct control like that explained with respect to S22 to S36 of FIG. 11. In this case, however, the flags F1 and F2 are renamed F3 and F4.

In other words, in this embodiment, the voltage control described earlier is conducted not only in the case of drive-off from standstill as shown in FIG. 12 but also in the case where an acceleration instruction is input after a stop instruction was input as shown in FIG. 14.

Smooth transition to speed control while reducing or eliminating shock caused by backlash of the reduction gear mechanism 32 is therefore also possible when accelerating after input of a stop instruction.

When the result in S10 is YES, or after the bit of the flag F4 has been set to 1 in S118, the program goes to S120, in which speed control (acceleration control) is conducted by applying voltage to the electric motor 28 at an increase rate (or decrease rate) of, for instance, 2.5 V/200 msec to obtain a desired speed.

When the result in S102 is NO, the program goes to S122, in which the bits of flags F3 and F4 are reset to 0, and then to S120.

Returning to the explanation of the flow chart of FIG. 11, when the result in S12 is NO, the program goes to S40, in which the bits of the flags F1 and F2 are reset to 0, and then to S42 in which stop processing is conducted. When the result in S14 is YES, the program goes to S44, in which the bits of the flags F3 and F4 are reset to 0, and then to S38.

The control system for a small electric motor vehicle configured in the foregoing manner according to this invention enables smooth drive-off of the vehicle 10 while also reducing or eliminating drive-off shock caused by backlash of the reduction gear mechanism 32 even when a high-capacity electric motor 28 is used to enhance hill-climbing performance.

The control system for a small electric motor vehicle also enables smooth transition to speed control (acceleration control) while reducing or eliminating shock caused by backlash of the reduction gear mechanism 32 also when accelerating after input of a stop instruction.

Figure 16:
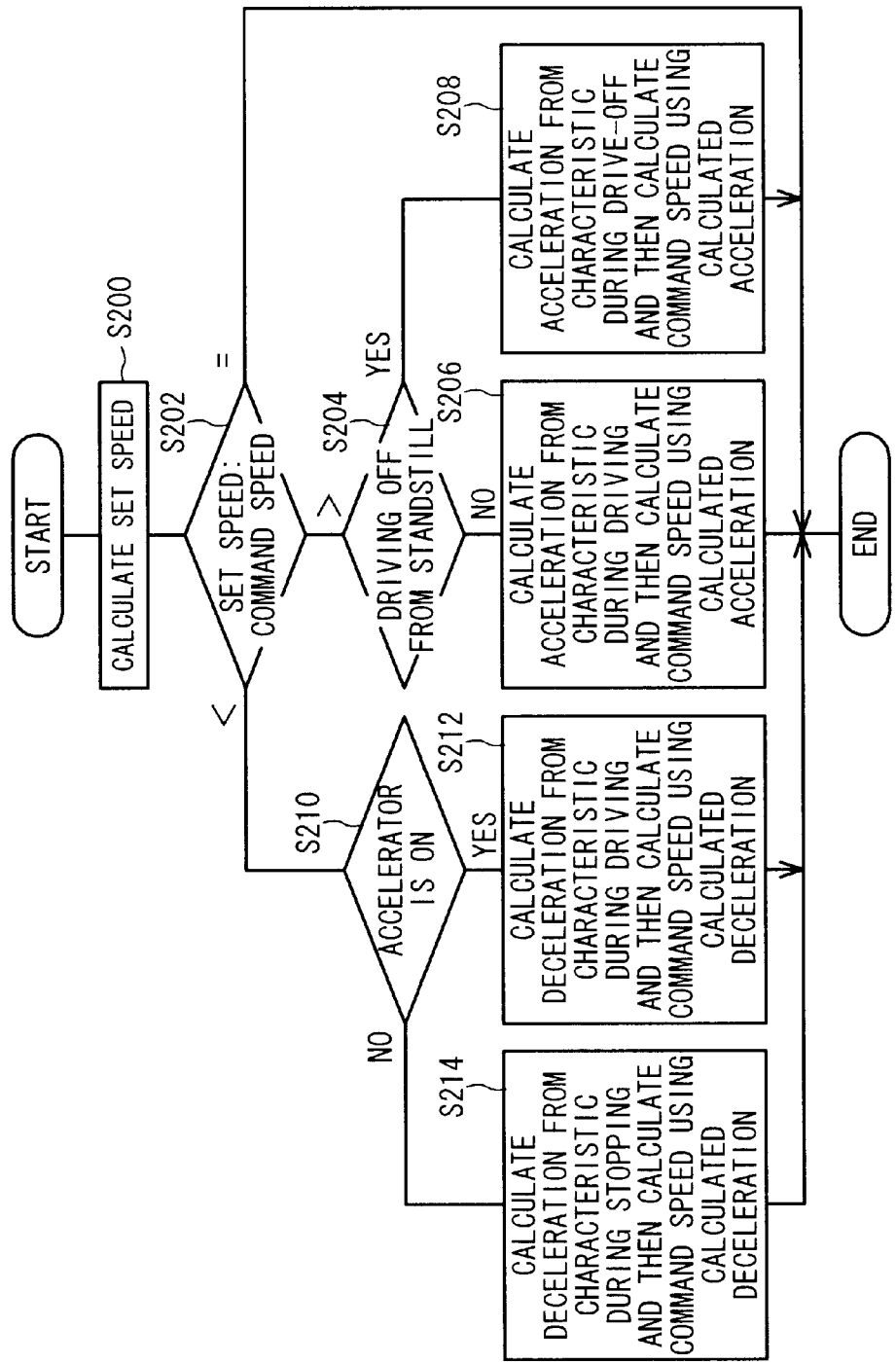
FIG. 16 is a flow chart showing the operations of a control system for a small electric motor vehicle according to a second embodiment of the invention.

FIG. 16 is a flow chart showing the operations of a control system for a small electric vehicle according to a second embodiment of the invention will now be explained. The program represented by the flow chart is similarly activated once every prescribed time interval.

First, in S200, the aforesaid set speed is calculated which is mentioned briefly in the first embodiment.

Figure 17:
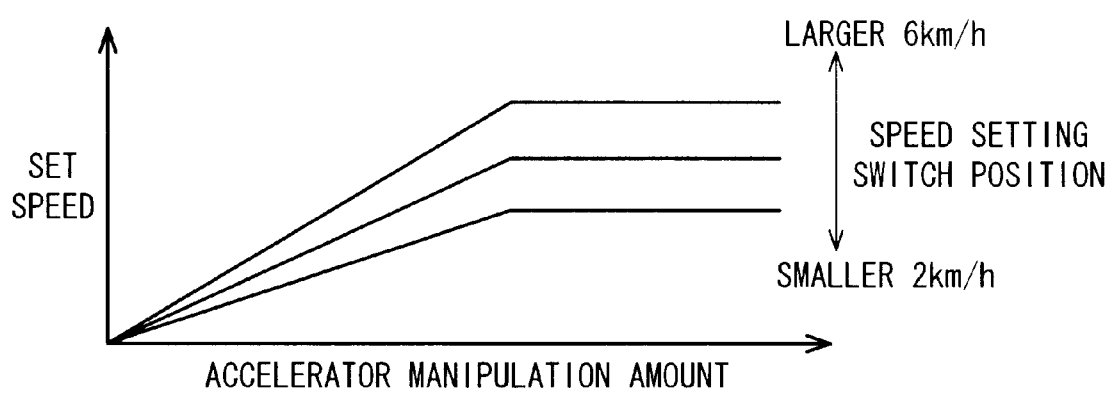
FIG. 17 is an explanatory graph showing the characteristics of mapped data used for set speed calculation in the flow chart of FIG. 16.

FIG. 17 is a graph for explaining this calculation. As shown, three sets of characteristics associated with different positions of the speed setting switch (maximum speed switch) 66 are established (mapped) beforehand relative to the amount of manipulation of the accelerator 68. In S200, therefore, the detected amount of manipulation of the accelerator 68 is used as address data for retrieving the set speed from the mapped characteristics corresponding to the position of the speed setting switch 66 selected by the operator.

Next, in 202, the calculated set speed is compared with the aforesaid command speed. As explained earlier, the command speed is a value for increasing/decreasing the driving speed (vehicle speed) of the vehicle 10 so as to obtain the calculated set speed. It is specifically a speed that increases/deceases (increase/decrease speed) once every 2 msec.

Specifically, the command speed is calculated as follows:

Command speed=Command speed (Initially zero)+Acceleration

In other words, the command speed is set at zero at the time of drive-off (from standstill). The acceleration is variably calculated in accordance with the difference between the command speed and the set speed. The term "acceleration" as used in the specification is defined as including "deceleration".

Figure 18:
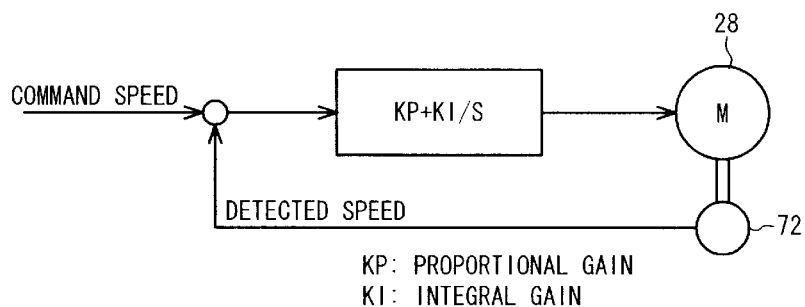
FIG. 18 is a block diagram showing speed feedback control based on a command speed calculated in the flow chart of FIG. 16.

The calculated command speed is subjected to the feedback control shown in FIG. 18 and the voltage applied to the electric motor 28 is feedback-controlled to reduce the deviation between the calculated command speed and the detected driving speed. Ignoring the steady-state deviation of the feedback control, therefore, the command speed becomes equal to the set speed and the set speed becomes substantially equal to the detected speed during driving.

In the flow chart of FIG. 16, when the set speed is found to be larger than the command speed in S202, it is judged that acceleration is required and the program goes to S204, in which it is checked whether drive-off from standstill is in progress. When the result in S204 is NO, it is judged that driving is in progress and the program goes to S206, in which the acceleration is calculated from the characteristics during driving and the command speed is calculated based on the foregoing equation.

Figure 19:
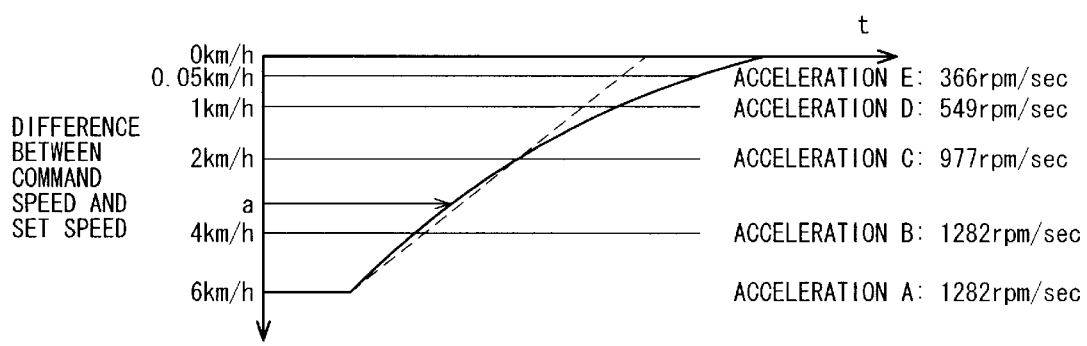
FIG. 19 is an explanatory graph showing the characteristics of acceleration at the time of driving and the time of drive-off used in the calculation of command speed in the flow chart of FIG. 16.

The solid curve in FIG. 19 is for explaining the characteristics during driving. As illustrated, five categories of acceleration, from A: 1,282 rpm/sec to E: 366 rpm/sec, are established in association with different values of the difference between the command speed and the set speed. When the difference is a, for example, acceleration B is selected and added to the value in the preceding cycle. Thus, acceleration (rate of speed increase/decrease) is changed in accordance with the difference between the set speed and the command speed, and is increased in proportion to increasing difference between the set speed and the command speed.

When the operator slightly manipulates the accelerator, the amount of increase in the set speed is proportionally small. Since the difference between the set speed and the command speed is therefore small, the acceleration E is selected. As the vehicle speed therefore does not change abruptly, the operator experiences no unnatural feeling. Thus the driving feel is enhanced.

When the result in S204 is YES, it is judged that drive-off is in progress and the program goes to S208, in which the acceleration is calculated from the characteristics during drive-off and the command speed is calculated based on the foregoing equation.

The broken curve in FIG. 19 is for explaining the characteristics during drive-off. As illustrated, only one kind of acceleration is defined for drive-off and is defined to be larger than that for driving indicated by the solid curve. As a result, there is no loss of feeling of acceleration at drive-off from standstill.

When it is found in S202 of the flow chart of FIG. 16 that the set speed is smaller than the command speed, it is judged that deceleration is required and the program goes to S210, in which it is checked whether the accelerator 68 is ON. When the result is YES, it is judged that driving is in progress and the program goes to S212, in which the deceleration is calculated from the characteristics during driving and the command speed is calculated based on the foregoing equation.

Figure 20:
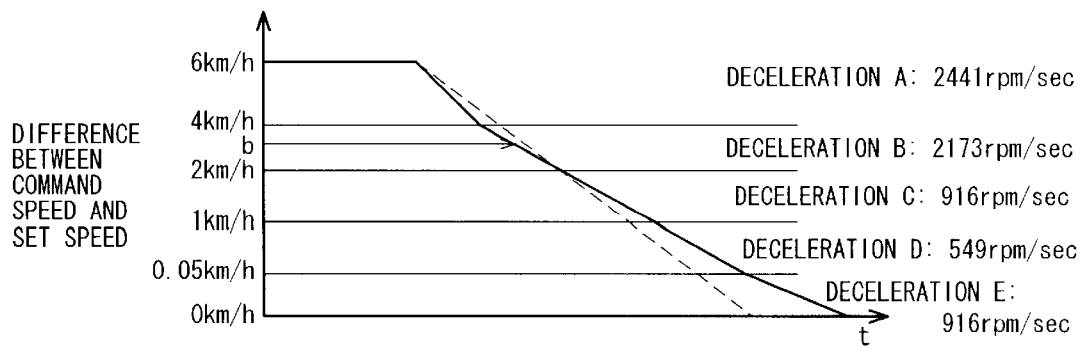
FIG. 20 is an explanatory graph showing the characteristics of deceleration at the time of driving and the time of drive-off used in the calculation of command speed in the flow chart of FIG. 16.

The solid curve in FIG. 20 is for explaining the characteristics during driving. As illustrated, five categories of deceleration (more generally acceleration), from A: 2,441 rpm/sec to D: 549 rpm/sec, and E: 916 rpm/sec, are established in association with different values of the difference between the command speed and the set speed. When the difference is b, for example, deceleration B is selected and added to the value in the preceding cycle.

Thus, deceleration (rate of speed increase/decrease) is also changed in accordance with the difference between the set speed and the command speed, and is increased in proportion to increasing difference between the set speed and the command speed. When the operator slightly manipulates the accelerator, the smallest acceleration E is selected. As the vehicle speed therefore does not change abruptly, the operator experiences no unnatural feeling. Thus the driving feel is enhanced.

When the result in S210 is NO, it is judged that a stop instruction was input and the program goes to S214, in which the deceleration is calculated from the characteristics during stopping and the command speed is calculated based on the foregoing equation.

The broken curve in FIG. 20 is for explaining the characteristics during stopping. As illustrated, only one kind of deceleration is defined for stopping and is defined to be larger than that for driving indicated by the solid curve. As a result, the vehicle 10 decelerates over a relatively short distance so that the required braking distance can be secured during stopping. When it is judged in S202 of the flow chart of FIG. 16 that the set speed and the command speed are equal, the processing is discontinued.

The control system for a small electric motor vehicle according to the second embodiment of the invention is configured to vary acceleration and deceleration (increase/decrease of driving speed) in proportion to the difference between the set speed and the command speed, more specifically to increase the acceleration or deceleration in proportion to increasing difference between the calculated set speed and the calculated command speed. When the operator manipulates the accelerator only slightly, therefore, the driving speed does not change abruptly and the operator experiences no unnatural feeling. The driving feel is therefore improved.

In addition, the acceleration at drive-off and the deceleration at stopping are set to be greater than those during driving. As a result, the driving feel is improved, the feeling of acceleration at drive-off is not lost, and the required braking distance can be secured at stopping.

Thus, the first embodiment is configured to have a system for controlling a small electric motor vehicle 10 equipped with an electric motor 28 for driving wheels 22, 36 through a reduction gear mechanism 32, comprising: a speed setting switch 66 which generates a signal indicative of a maximum speed inputted by a vehicle operator; an accelerator 68 which generates signals indicative of drive-off instruction and stop instruction inputted by the vehicle operator; and an electric motor controller (control unit 50) which inputs the signal generated by the speed setting switch and the accelerator and determines a desired speed and conducts a first voltage control of the electric motor such that a driving speed converges the desired speed; wherein the electric motor controller conducts a second voltage control to immediately apply a first predetermined voltage (startup compensation voltage V1) to the electric motor when the drive-off instruction is generated from vehicle standstill and then to increase the voltage at a predetermined rate until the voltage exceeds a second predetermined voltage (startup limit voltage V2) (S10 to S36), and then conducts the first voltage control such that the driving speed converges to the desired speed (S38, S100 to S122).

When the operator of the small electric vehicle inputs an instruction to drive off from standstill, the first predetermined voltage is immediately applied to the electric motor and the voltage control is then conducted to increase the applied voltage at a predetermined increase rate until it reaches the second predetermined voltage. Since the application of the first predetermined voltage slightly rotates the electric motor to take up reduction gear mechanism backlash, shock at drive-off caused by reduction gear mechanism backlash can be reduced or eliminated even when a high-capacity electric motor is used to enhance hill-climbing performance.

Moreover, voltage control is first conducted to increase the applied voltage at a predetermined increase rate until it reaches the second predetermined voltage and the applied voltage is thereafter controlled to obtain the desired speed. Smooth drive-off is therefore possible (S14, S38, S100 to S118).

In the system, the electric motor controller conducts the second voltage control even when the drive-off instruction is generated after the stop instruction was generated.

Since the voltage control is also conducted when a drive-off instruction is input after a stop instruction was input, shock caused by reduction gear mechanism backlash can be reduced or eliminated and a smooth transition to speed control (acceleration control) can be realized even in a state of re-acceleration.

The system further includes driving start discriminating means (rotary encoder 72, control unit 50) for discriminating whether or not the vehicle has started driving, and the electric motor controller discontinues the voltage control and immediately controls the voltage such that the driving speed converges to the desired speed, when it is discriminated that the vehicle has started driving (S18, S32, S38, S114, S120).

When it is discriminated that driving has started, the voltage control is discontinued and the applied voltage is controlled to obtain the desired speed. Therefore, when the small electric vehicle rolls back contrary to the intention of the operator, such as at drive-off on an uphill slope, further rollback can be prevented and driving in the desired direction ensured. Moreover, as reduction gear mechanism backlash is ordinarily minimum under such circumstances, the aforesaid voltage control is essentially unnecessary.

In the system, the driving start discriminating means comprises rotation direction detection means (rotary encoder 72, control unit 50) for detecting a direction of rotation of the electric motor; and the electric motor controller discontinues the voltage control and immediately controls the voltage such that the driving speed converges to the desired speed, when it is detected that the detected electric motor rotation direction is opposite from a direction of the drive-off instruction (S18, S32, S38, S114, S120).

When the detected direction of rotation of the electric motor is opposite from the rotation direction for driving in the instructed drive-off direction, the applied voltage is immediately controlled to obtain the desired speed. Therefore, when the small electric vehicle rolls back contrary to the intention of the operator, such as at the time of uphill drive-off on a slope, further rollback is prevented and driving in the desired direction is ensured.

The second embodiment is configured to have a system for controlling a small electric motor vehicle 10 equipped with an electric motor 28 for driving wheels 22, 36 through a reduction gear mechanism 32, comprising: a speed setting switch 66 which generates a signal indicative of a maximum speed inputted by a vehicle operator; an accelerator 68 which generates signals indicative of drive-off instruction and stop instruction inputted by the vehicle operator; a speed controller (control unit 50) which calculates a set speed based on the signals of the speed setting switch and the accelerator and calculates a command speed to accelerate or decelerate, a driving speed at a rate which is varied with a difference between the set speed and the command speed, such that a driving speed converges to the set speed (S200, S206, S208, S212, S214); and an electric motor controller (control unit 50) which feedback-controls a voltage to be applied to the electric motor such that an error between the command speed and the driving speed decreases.

Since the rate of increase/decrease of the driving speed is varied in proportion to the difference between the calculated set speed and the calculated command speed, a rate of speed increase/decrease, i.e., a rate of acceleration and a rate of deceleration, can be determined that does not cause abrupt change in the driving speed (vehicle speed) when the operator manipulates the accelerator slightly. The driving feel is therefore improved.

In the system, the rate is increased with increasing the difference between the set speed and the command speed (S206, S212).

The rate of increase/decrease of the driving speed is increased in proportion to increasing difference between the calculated set speed and the calculated command speed. When the operator only slightly manipulates the accelerator so that the difference is small, therefore, the rate of increase/decrease, i.e., the acceleration and deceleration, is small. The driving feel is therefore effectively improved.

In the system, the rate during driving is larger than at least one of that during the drive-off instruction and the stop instruction is generated (S206, S208, S212, S214).

Since the rate of increase/decrease of the driving speed is made greater at the time of at least one of drive-off and stopping, specifically at the time of at least one of a drive-off instruction and a stop instruction, than at the time of driving, the driving feel is improved, the feeling of acceleration at drive-off is not lost, and the required braking distance can be secured at stopping.

Although the invention was described with respect to the case of using a rotary encoder as the driving start discriminating means and the rotation direction detection means, any of various types optical and other sensors capable of detecting rotation of the electric motor 28 can be used instead.

The entire disclosure of Japanese Patent Application Nos. 2000-248583 and 2000-248584 both filed on Aug. 18, 2000, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a small electric motor vehicle equipped with an electric motor for driving wheels through a reduction gear mechanism, comprising:
    a speed setting switch which generates a signal indicative of a maximum speed inputted by a vehicle operator;
    an accelerator which generates signals indicative of drive-off instruction and stop instruction inputted by the vehicle operator; and
    an electric motor controller which inputs the signal generated by the speed setting switch and the accelerator and determines a desired speed and conducts a first voltage control of the electric motor such that a driving speed converges to the desired speed;
    wherein the electric motor controller conducts a second voltage control to immediately apply a first predetermined voltage to the electric motor when the drive-off instruction is generated from vehicle standstill and then to increase the voltage at a predetermined rate until the voltage exceeds a second predetermined voltage, and then conducts the first voltage control such that the driving speed converges to the desired speed.

2. A system according to claim 1, wherein the electric motor controller conducts the second voltage control even when the drive-off instruction is generated after the stop instruction was generated.

3. A system according to claim 1, further including driving start discriminating means for discriminating whether or not the vehicle has started driving,
    and the electric motor controller discontinues the voltage control and immediately controls the voltage such that the driving speed converges to the desired speed, when it is discriminated that the vehicle has started driving.

4. A system according to claim 3, wherein the driving start discriminating means comprises rotation direction detection means for detecting a direction of rotation of the electric motor;
    and the electric motor controller discontinues the voltage control and immediately controls the voltage such that the driving speed converges to the desired speed, when it is detected that the detected electric motor rotation direction is opposite from a direction of the drive-off instruction.

5. A system according to claim 2, further including driving start discriminating means for discriminating whether or not the vehicle has started driving,
    and the electric motor controller discontinues the voltage control and immediately controls the voltage such that the driving speed converges to the desired speed, when it is discriminated that the vehicle has started driving.

6. A system according to claim 5, wherein the driving start discriminating means comprises rotation direction detection means for detecting a direction of rotation of the electric motor;
    and the electric motor controller discontinues the voltage control and immediately controls the voltage such that the driving speed converges to the desired speed, when it is detected that the detected electric motor rotation direction is opposite from a direction of the drive-off instruction.

7. A system for controlling a small electric motor vehicle equipped with an electric motor for driving wheels through a reduction gear mechanism, comprising:

a speed setting switch which generates a signal indicative of a maximum speed inputted by a vehicle operator;

an accelerator which generates signals indicative of drive-off instruction and stop instruction inputted by the vehicle operator;

a speed controller which calculates a set speed based on the signals of the speed setting switch and the accelerator and calculates a command speed to accelerate or decelerate a driving speed at a rate which is varied with a difference between the set speed and the command speed, such that a driving speed converges to the set speed; and an electric motor controller which feedback-controls a voltage to be applied to the electric motor such that an error between the command speed and the driving speed decreases.

8. A system according to claim 7, wherein the rate is increased with increasing the difference between the set speed and the command speed.

9. A system according to claim 7, wherein the rate during driving is larger than at least one of that during the drive-off instruction and the stop instruction is generated.

10. A system according to claim 7, wherein the rate during driving is larger than at least one of that during the drive-off instruction and the stop instruction is generated.

* * * * *